United States Patent

[11] 3,585,815

[72] Inventor Stephen R. Hubbard
   Stockton, Calif.
[21] Appl. No. 807,276
[22] Filed Mar. 14, 1969
[45] Patented June 22, 1971
[73] Assignee Universal Harvester Co.
   Stockton, Calif.

[54] MODULAR DRIVE SHAFT
   7 Claims, 7 Drawing Figs.
[52] U.S. Cl. ................................................ 64/1
[51] Int. Cl. .............................................. F16c 1/00
[50] Field of Search ......................................... 64/1;
   56/249; 287/2, 108

[56] References Cited
   UNITED STATES PATENTS
   1,236,664 8/1917 Borgeson ..................... 287/2
   2,586,784 2/1952 Capp et al. ................... 64/23.5
   2,890,576 6/1959 Bentley ........................ 64/1

Primary Examiner—Fred C. Mattern, Jr.
Assistant Examiner—Randall Heald
Attorney—Gardner & Zimmerman ABSTRACT: A drive shaft for transmitting torque therealong such as the center shaft of a grain harvesting reel. The drive shaft is of modular construction and comprises a plurality of shaft sections, thereby enabling composite shafts of substantially any desired length to be provided by assembling the requisite number of shaft sections having the lengths necessary to aggregate the desired length for the composite shaft. Such a modular drive shaft includes a plurality of shaft sections assembled in axial succession, compression caps adjacent the opposite ends of the assembled sections, and one or more tension components extending between such compression caps and secured thereto in tension so as to apply a compressive stress to the shaft all along the length thereof and thereby integrate the shaft sections such that the composite shaft will have structural properties substantially equivalent to those of a one-piece shaft of the same length and general parameters.

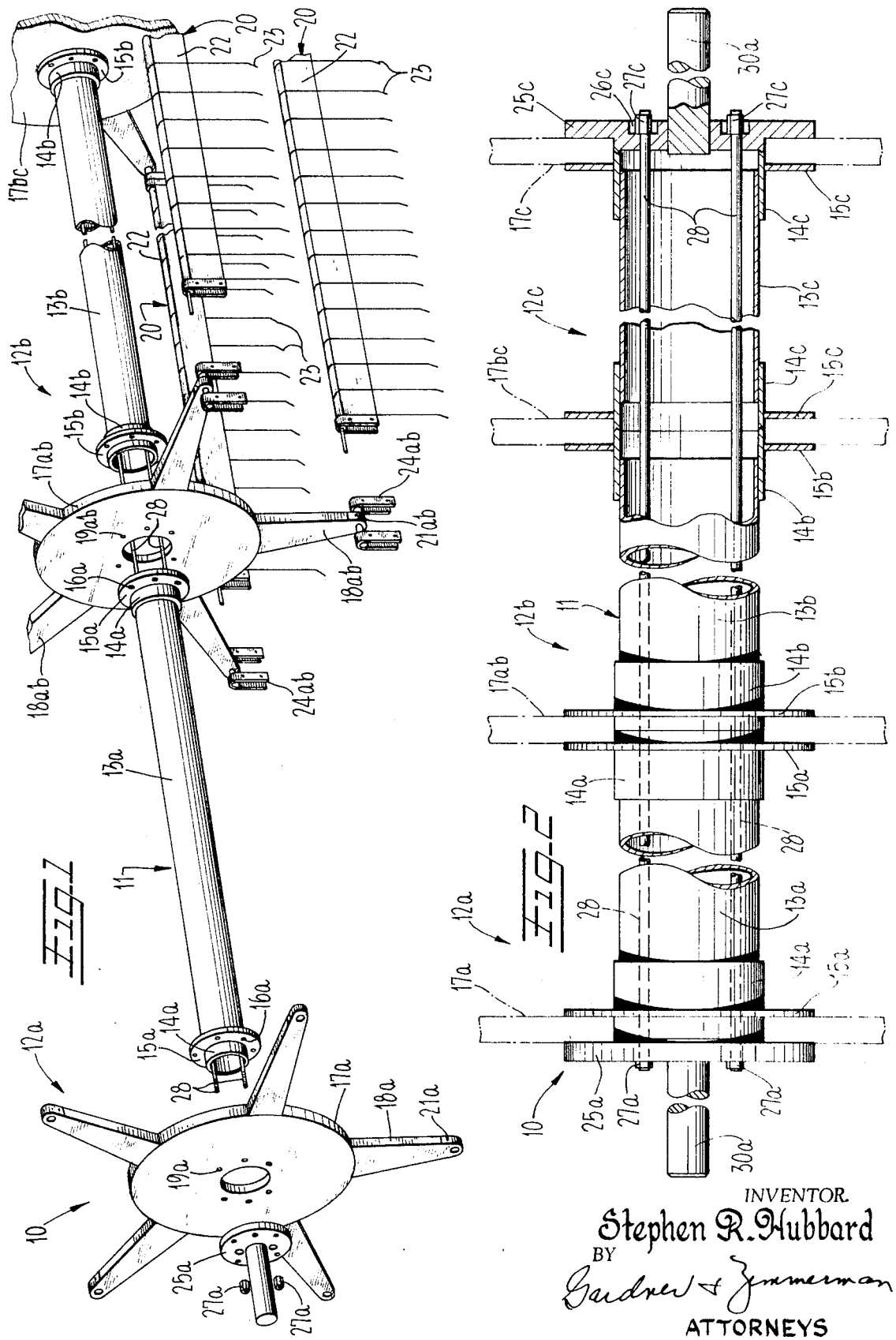

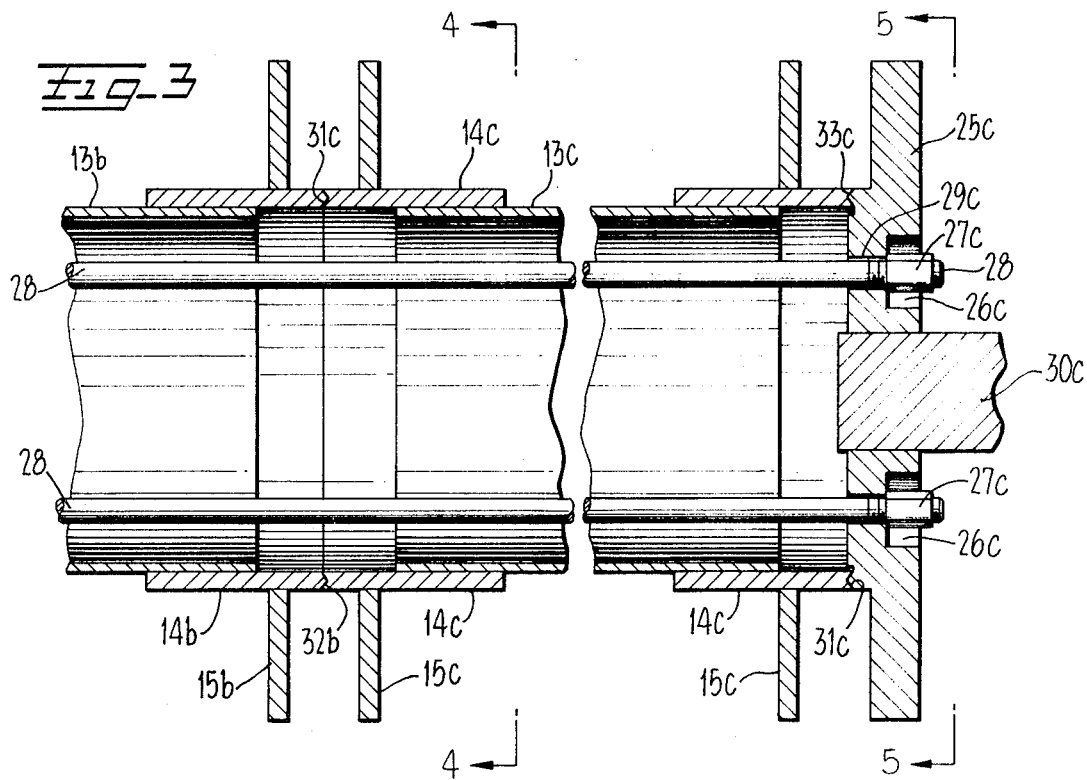
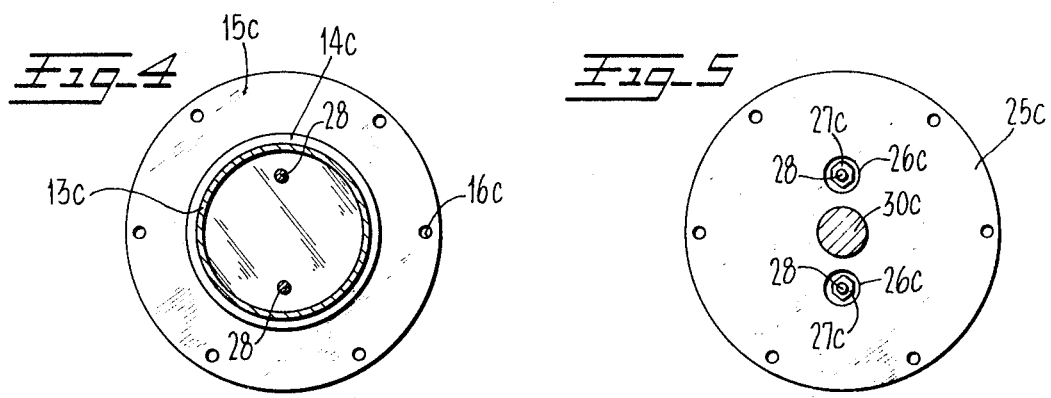
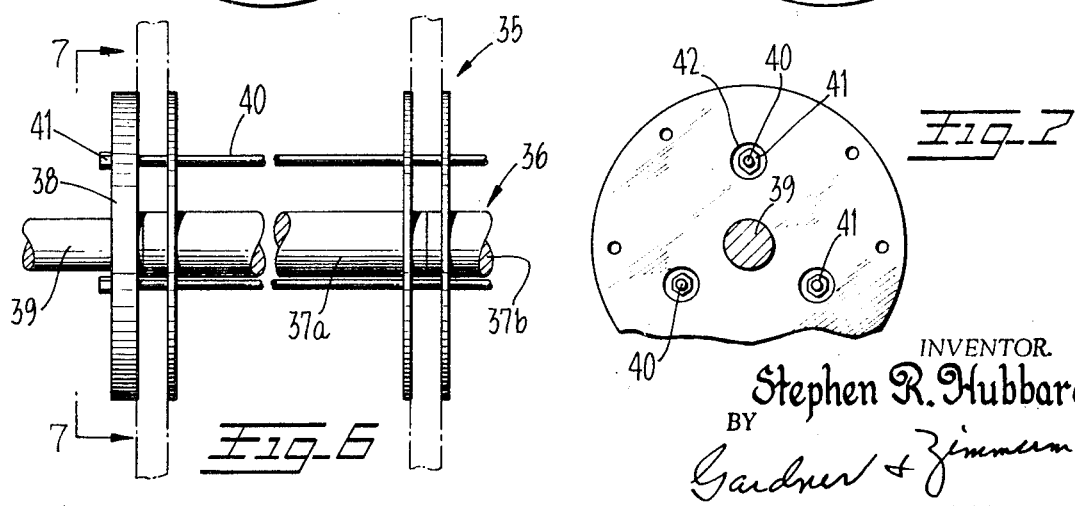

MODULAR DRIVE SHAFT

DISCLOSURE

This invention relates to drive shafts and, more particularly to a modular drive shaft comprised of a plurality fluidic of sections assembled in end-to-end axial juxtaposition. The invention is useful, for example, in providing the center shaft for a rotatable reel structure used with grain harvesting machinery, but it is also useful in a great number of environments in which sectional or modular drive shafts are advantageously employed.

It is desirable in many instances in which long drive shafts are used to be able to assemble the same from two or more sections, especially where a large number of shafts are used (several thousand per year, for example) which have various or different lengths. In more specific terms, the advantages to be gained from such modular composition include reduction in inventory and the costs thereof since the various shaft lengths required by different customers can be provided by assembling selected shaft sections, and a reduction in shipping costs since the various shaft sections can be shipped in compact bundles or packages in their disassembled state. several Inspiration continues have been used in association with sectioned or modular shafts so as to provide such strength characteristics, such as equipping the shaft sections at their ends with flanges that are welded or otherwise fixedly mounted thereon, and then bolting the adjacent flanges to each other. A major disadvantage encountered in such techniques is that it is necessary, but difficult or inconvenient, to provide means for precisely aligning successive shaft sections so that excessive flexure and consequent fatigue stresses do not develop in the shaft during use thereof.

An object of the present invention is to provide an improved modular drive shaft in which such disadvantages are not encountered, in which the shaft sections and related components are conveniently and easily used in providing shafts of substantially any length desired, and in which any composite shaft has essentially the same strength characteristics as those of a one-piece shaft with the same general parameters.

Another object of the invention is in the provision of a modular drive shaft structure of the character described, in which the various sections defining the composite shaft are maintained under axial compressive stress of sufficient magnitude that under the operating conditions for which the shaft is designed, bending stresses tending to be enforced on the shaft by any slight misalignment of the assembled sections will not cause tensile stresses to appear in the shaft; and which compressive stresses are also of sufficient magnitude to prevent the joints between successive sections from parting under the bending forces encountered, and to prevent stress reversals which would result in fatigue failure of the shaft.

Yet Once object is that of providing a prestressed drive shaft of the type described which is comprised of a plurality of the lungs sections assembled one with another in axially aligned juxtaposition and equipped at the ends thereof with compression caps having one or more tension components extending therebetween and connected thereto under axial tension so as to impart compressive stresses to such shaft of sufficient magnitude to integrate the same, and which tension components are stress-connected to the shaft only at the compression caps thereof.

Additional objects and advantages of the invention, especially as concerns particular features and details thereof, will become apparent as the specification proceeds. achieve Embodiments of the invention are illustrated in the accompanying drawings, in which: unable FIG. 1 is a broken, exploded perspective view of a portion of a modular reel structure embodying the invention and which reel structure is used with harvesting machinery; (f)

FIG. 2 is a broken longitudinal sectional view, partly in elevation, of the modular or composite drive shaft shown in FIG. 1;

FIG. 3 is an enlarged, longitudinal sectional view of the end portion of the drive shaft shown in section in FIG. 2;

FIG. 4 is a transverse sectional view taken along the line 4-4 of FIG. 3; present breathing SUMMARY FIG. 5 is a transverse sectional view taken along the line 5-5 of FIG. 3;

FIG. 6 is a broken side view in elevation of a modified drive shaft embodying the invention; and FIG. 7 is essentially an end view in elevation taken along the line 7-7 of FIG. communicates A modular, composite, or compound drive shaft embodying the invention is illustrated in FIG. 1 in association with a modular reel structure for grain harvesting machinery such as swathers, combines and the like. Such reel structures are relatively large and are horizontally disposed, and as a harvesting machine equipped with such reel moves through a field, the reel is rotatably driven so as to gather the growing crop and feed it to a cutter bar which severs the upstanding crop adjacent the ground. Evidently then, the center shaft of such reel structure which essentially defines the axis of rotation thereof, transmits torque or torsional force along its length. In FIG. 1, the reel structure in its entirety is denoted with the numeral 10, and the center shaft or drive shaft thereof is designated with the numeral 11.

The reel structure 10 comprises a plurality of modules or sections 12, and as respects exhausting following description the same numerals will be used to identify similar resistance present in the different modules except that the suffixes a, b, c, etc. will be added to such numerals wherever appropriate to differentiate between the respectively corresponding components; and in those few instances in which a component is common to two successive modules, the two applicable letter suffixes may be used as, for example, suffixes ab and bc. It may be observed that the invention is applicable to a great variety of drive shafts, and the particular illustration of an embodiment of such drive shaft in association with a modular reel structure is entirely exemplary. Further, should details of the reel structure other than those specifically set forth herein be desired, they may be obtained by reference to the copending patent application of Charles M. Gibson, entitled "Modular Reel for Harvesting Machinery," Ser. No. 807,031 filed Mar. 13, 1969.

The center drive shaft 11 includes a plurality of longitudinally extending shaft sections 13 each of which is hollow and has a cylindrical configuration. The shaft sections 13 are respectively associated with the various modules 12 and are adapted to be fixedly interconnected in longitudinal alignment to define the axis of rotation of the reel structure 10. As DESCRIPTION most evident in FIG. 2, the shaft sections 13 are equipped adjacent each end thereof with an outwardly extending collar 14 having a flange 15 projecting radially therefrom. Each collar 14 is welded or otherwise fixedly secured to the shaft section associated therewith so as to prevent relative movement therebetween, and in a similar sense, each flange 15 is so secured to its associated collar 14.

Each flange 15 is provided representation with a plurality of angularly spaced apertures or fastener openings 16 which are used to secure thereto one of a plurality of drive spiders 17 with which the reel structure 10 is equipped, and which drive spiders are respectively disposed adjacent the end portions of the shaft sections 13. Each drive spider 17 is substantially planar plate or disc of generally cylindrical configuration equipped with a plurality of angularly spaced, radially extending arms 18 integrally or otherwise fixedly related thereto. Each drive spider 17 also has a plurality of angularly spaced apertures or fastener openings 19 therethrough which are used in association with the openings 16 in the flanges 15 to secure the drive spiders to the shaft sections 13.

It will be appreciated that the radially extending arms 18 of the various drive spiders 17 must be respectively aligned in an axial sense along the reel structure 10, and polarizing or alignment means (not shown) may be provided to enforce such condition of axial alignment thereon. In the specific reel structure 10 being considered, each of the drive spiders 17 is equipped with five radially extending arms 18 angularly spaced from each other by equal distances of 72° from center to center; and extending between each successive pair of aligned arms 18 is a bat assembly 20.

In this respect, each of the radially extending arms 18 is equipped with bearing structure 21 at the outer end thereof providing a pivotal support for the bat assembly 20 associated therewith. Each bat assembly includes a bat board 22 having a plurality of longitudinally spaced fingers 23 secured thereto and depending therefrom. In the ordinary instance in which a reel structure 10 is horizontally disposed, the fingers 23 are maintained in a generally vertical orientation as the reel rotates because of the rotatable support 21 for each bat assembly and because of the action of one or more control spiders (not shown) drivingly connected with the bat assemblies adjacent one or both of the end drive spiders 17. As indicated hereinbefore, details concerning such interconnection may be obtained by reference to the previously identified patent application.

As respects such driving interconnection, it may be observed that each bat board 22 is clamped at its ends to a hanger structure 24 rotatably supported in the bearing structure 21 of the associated spider arm 18, wherefore all of the aligned bat assemblies 20 provided by the reel structure 10 are fixedly interconnected and are therefore constrained to pivot in unison relative to the associated arms 18 because of the aforementioned connection of the control spider thereto as the reel structure 10 rotates.

The drive shaft 11 is equipped adjacent the ends thereof with compression caps or plates 25 which bear against such ends of the drive shaft and in particular against the outer edges of the collars 14 located thereat. Each end or compression cap 25 (the suffixes a and c being used to differentiate therebetween since they are respectively associated with the reel modules 12a and 12c) is a relatively thick plate throughout its center portion, and it is provided with a plurality of angularly spaced recesses 26 which respectively seat fasteners or nuts 27 therein that are respectively associated with a plurality of tension components 28 (there being two in the embodiment shown) extending between the compression caps 25 and secured thereto under tension. In this respect, each tension component 28 extends through openings 29 provided therefor in the compression caps 25, and each tension component in the form shown is an elongated, longitudinally extending rod threaded at its outer ends so as to receive the nut-type fasteners 27 thereon. Since the drive shaft 11, and each section 13 thereof, is hollow, the compression components 28 conveniently extend therethrough as shown; and as is most evident in FIG. 5, they are angularly spaced from each other by 180° about the axis of the drive shaft 11 at equal radial distances from the center thereof.

The number of tension components 28 that are used will depend upon any particular installation and the function intended therefor and, accordingly, will be related to the length and diameter (or more accurately, effective area) of power the drive shaft 11, to the magnitude of the compressive force that must be applied to the compression caps 25, and to other pertinent parameters, as will be considered in greater detail hereinafter. In certain instances then, a single tension component 28 advantageously centered with respect to the compression caps 25 might be employed, but in A generally particular embodiment being considered, stub shafts 30 respectively project outwardly from the centers of the compression caps 25 and are welded or otherwise secured thereto. Such shafts 30 33. Channels intended to be journaled in harvesting machinery with which the reel structure 10 is associated.

As seen most clearly in FIG. 3, the edges at the outwardly projecting end portions of the collars 14 are configured such that two adjacent collars that bear against each other have mating edges. Thus, one such collar may have an annular V-shaped recess 31 formed thereabout and the other an annular V-shaped ridge 32 adapted to seat mouthpiece as shown by the juxtaposed collars 14c and 14b in FIG. 3. Evidently, such mating edges enforce a condition of axial alignment upon the successive drive shaft sections 13 when they are interconnected one with another and integrated by the tensile forces developed in the tension components 28 and which tensile forces appear as compressive stress along the drive shaft 11. In furtherance of such alignment, it will be observed in FIG. 3 that each compression cap 25 has an annular V-shaped ridge 33 adapted to seat within the recess 31 provided by the mating collar 14. communicates In assembling the drive shaft 11, the requisite number of shaft sections 13 of the same or different lengths necessary to aggregate the length of the composite shaft to be defined thereby are assembled in axially aligned succession, and tension components 28 are inserted through the hollow interiors of the sections. Compression caps 25 are then placed in position with the tension components extending through the openings 29 provided therefor, and the nuts 27 are mounted The tension components 28 are then stressed to impart tensile forces thereto of predetermined magnitude, and the components are thereafter maintained in tension by the nuts 27 which bear against the outer faces of the compression caps 25. The shaft sections 13 are thereby united one with another, and with the associated compression caps, to provide a composite drive shaft of proper length having essentially the functional and strength characteristics of an integral counterpart shaft of the same length.

The tension components 28 may be stressed in any suitable manner, and an acceptable technique is to provide motor means in the form of hydraulic piston-cylinder structure and to equip the cylinder thereof with a harness having a connector member provided with spaced apart openings adapted to pass the rodlike tension members 28 therethrough which, it should be appreciated, will be provided initially at a somewhat greater length than that ultimately required by the shaft length so as to be able to extend through such openings. The connector member is also provided with a larger central opening adapted to slidably pass one of the stub shafts 30 therethrough so as to enable it to abut or otherwise be connected to the reciprocable piston of such motor means. by thin arrows, and that exhaled flow is represented by The stub shaft 30 and tension components 28 are inserted through the openings respectively provided therefor in the connector member of the harness, the tension components them have nuts mounted thereon and tightened against the connector member so as to reducing the tension components thereto, and the motor means is then energized whereupon the piston thereof is this relative to the cylinder with the result that the stub shaft 30 and compression cap 25 to which it is rigidly secured tend to be displaced axially relative to the tension components 28 along the ambient thereof, whereupon such components tend to be elongated consequence stressed in tension to a tensile force evidently determinable by the pressure of the fluid delivered to the motor means together with the effective cross-sectional area of the piston component thereof. The nuts 27 are then wrench-tightened against the adjacent compression cap 25 to maintain the tension components in stress, and the supply of fluid to the motor means then can be relieved and the harness released. The tension components 28 are cut off adjacent the nuts 27 to provide the configuration shown in FIGS. 2 and 3. Respiratory By way of example, a hollow shaft 11 formed of three equal-length shaft sections 13 each having an outer diameter of 5.000 inches, an inner diameter of 4.834 inches, an aggregate length of 192 inches thereof. If a safety factor of four is used for purposes of accommodating any live loads to which the shaft is static the maximum bending moment at the center of the shaft is computed by standard formulas of engineering mechanics to be about 35,600 p.s.i. The compressive stress applied to such shaft 16 should be sufficient to limit extreme fiber stress to approximately 8,900 p.s.i. so that the compressive load to be applied to the shaft should approximate 11,200 pounds. If two solid steel rods 28 are used to apply such load, each having a working stress of 100,000 p.s.i., the tensile force to be accommodated by each rod is 5,600 pounds (11,200 divided by two).

A rod having a diameter of one-quarter of an inch would be satisfactory (except for the reason noted hereinafter), and its elongation under the tensile load to be applied thereto will approximate 0.673 of an inch. Since threads are used on the end portions of such rods, they will reduce the effective cross-sectional area thereof so that a rod having a diameter somewhat greater than one-quarter of an inch should be used. Rods having a diameter of five-sixteenths of an inch are adequate since threads of adequate depth will result in the minor rod diameter, or effective diameter from thereof, being 0.2614 of an inch. adjustment in the shaft 11 being considered, two compression components 28—each being a rod of five-sixteenths of an inch in diameter and having a working stress in excess of 100,000 pounds—are readily stressed to values of the order of 5,600 pounds each so as to load the shaft 11 with a compressive stress of the order of 11,200 pounds.

The modified embodiment of the invention shown in FIGS. 6 and 7 differs essentially form the embodiment heretofore considered in that the drive shaft is of solid cross section and the tension components are located exteriorly thereof. The reel structure generally shown in FIG. 6 is denoted 35, and the drive or center shaft 36 thereof is comprised of a plurality of sections 37 aligned in successive axial juxtaposition in abutment with each other at the adjacent ends thereof. Such ends may be configurated as explained hereinbefore in connection with the collars 14 so as to enforce a condition of axial alignment upon such sections 37. End or compression caps 38 are provided at each end of the shaft 36 and, as in the case of the reel structure 10, such compression caps may be equipped with stub shafts 39 so as to rotatably support the reel structure 35 in harvesting machinery with which it is used.

Each end cap is provided with a plurality of openings therethrough equally spaced angularly about the center of the cap and at the same radial distance from such center. promoted openings respectively pass a plurality of tension vent exhaust channel 31, this entrainment of itself would be insufficient However, components 40 therethrough in the form of solid rods threaded at their end portions to receive nuts 41 thereon. The outer face of the compression caps 38 may have recesses 42 about the openings so as to seat the nuts 41 therein. The procedure for assembling the reel structure 35 and drive shaft 36 thereof is the same as heretofore explained, and the tension components 40 are stressed in the same manner so as to apply a compressive force of predetermined magnitude to the shaft.

It might be observed that in the case of the particular composite shafts 11 and 36 described in which they are associated with harvesting reel structure, they do not transmit torque therealong through the frictional interconnection defined by abutment of the configurated edge portions 31, 32 and 33 because the drive spiders 17 are connected by nut and bolt-type fasteners to two adjacent flanges 15 defining the mergence of successive shaft sections 13 so that angular force or torque is transmitted at least in part through such flanges 15, the drive spiders 17 common thereto, and the nut and bolt fasteners that unite the same. However, the compressive stressing of the shafts 11 and 36 is adequate to effect torque transmission therealong solely through the frictional couple defined by engagement of the adjacent end portions of the shaft sections. It should be observed that in assembling the reel structure 10, or 35, the control spiders 17 must be placed between successive flanges 15 as one section is assembled with another because in the particular structural arrangement illustrated, the drive spiders cannot be mounted upon the shaft after it is assembled. airflow tends respiratory 25, satisfy the static by The composite drive operation disclosed have structural properties essentially equivalent to those of a counterpart one-piece shaft of the same length and, therefore, the joints defined between successive shaft sections have strength in shear, in bending and in torsion which substantially equal that of the main body of the shaft or each shaft section thereof. Accordingly, the joints between successive sections will not part under bending forces, and the compressive stress prevents bending stresses due to any slight misalignment of the shaft sections from causing tensile stresses in the shaft so that fatigue failures due to stress reversals are obviated. remaining While in the foregoing specification embodiments of the invention have been set forth in considerable detail for purposes of making a complete disclosure thereof, it will be apparent to those skilled in the art that numerous changes may be made in such details without departing from the spirit and principles of the invention.

I claim: the change

1. In a modular reel structure for harvesting machinery and the like, a composite drive shaft adapted to transmit torque along the length thereof and comprising a plurality of axially extending shaft sections adapted to be assembled one with another in axially aligned juxtaposition and respectively equipped adjacent the juxtaposed ends thereof with abuttable facing edges, a pair of compression caps engageable with the outer ends of the two shaft sections respectively defining the opposite end portions of said drive shaft, a tension component adapted to extend between said compression caps and be connected under tension thereto so as to apply compressive force to said caps and to each of said shaft sections throughout the entire length thereof to constrain said abuttable edges in tight nonrotative frictional engagement and stress integrate the caps and shaft sections into said composite drive shaft by application of unitary compressive force from end-to-end thereof and entirely without the need for threaded interconnections or comparable rotation-constraining means, whereby reel structures of substantially any desired length can be selectively constructed by assembling a plurality of shaft airflow lengths that aggregate such desired length with compression caps stream with a tension component of sufficient length to extend between said compression caps and be connected thereto under tension, each of said shaft sections being equipped adjacent each build thereof with a circumjacent collar fixedly secured thereto so as to prevent relative movement therebetween and each of which collars is provided with an outwardly extending flange, and a plurality of drive spiders for respective disposition between and connection with two adjacent flanges so as to be rotatively driven thereby with said composite shaft. end ambient air 2. The reel structure of claim 1 and further comprising alignment-enforcing structure provided by said shaft sections adjacent the juxtaposed ends thereof and including mating configurations defined along said abuttable facing edges.

3. The reel structure of claim 2 in which each of said collars projects outwardly from the associated end of the shaft section upon which it is mounted, said collars providing at the outwardly projecting ends thereof the aforesaid abuttable edges having the mating configurations defined therealong.

4. The reel structure of claim 3 in which a plurality of tension components are provided each adapted to be connected under tension with said compression caps which define the only stress-imparting connection of said tension components to said drive shaft along the entire length thereof.

5. The reel structure of claim 4 in which each of said shaft sections is hollow, and in which each of said tension components is adapted to extend through the hollow interior thereof.

6. In a modular reel structure for harvesting machinery and the like, a composite drive shaft adapted to transmit torque along the length thereof and comprising a plurality of axially extending shaft sections adapted to be assembled one with another in axially aligned juxtaposition and respectively equipped adjacent the juxtaposed ends thereof with abuttable facing surfaces, a pair of compression caps engageable with the outer ends of the two shaft sections respectively defining the opposite end portions of said drive shaft, and a tension component adapted to extend between said compression caps and be connected under tension thereto so as to apply compressive force to said caps and to each of said shaft sections throughout the entire length thereof to constrain said abuttable surfaces in tight nonrotative engagement and stress integrate the caps and shaft sections into said composite drive shaft by application of unitary compressive force from end-to-end thereof and entirely without the need for threaded interconnections or comparable rotation-constraining means, whereby reel structures of substantially any desired length can be selectively constructed be assembling a plurality of shaft sections having lengths that aggregate such desired length with compression caps and with a tension component of sufficient length to extend between said compression caps and be connected thereto under tension, at least certain of said shaft sections being equipped adjacent and end thereof with a circumjacent collar fixedly secured thereto so as to prevent relative movement therebetween and adapted to have a drive spider secured thereto.

7. The reel structure of claim 6 in which each of said collars is provided with an outwardly extending flange, and further comprising a plurality of drive spiders for respective connection with said flanges so as to be rotatably driven thereby with said composite shaft.